United States Patent Office 3,136,793
Patented June 9, 1964

3,136,793
1-HYDROXYLATED PREGNENE COMPOUNDS
George Greenspan, New Brunswick, and Carl P. Schaffner, Somerville, N.J., assignors, by mesne assignments, to Schering Corporation, Bloomfield, N.J., a corporation of New Jersey
No Drawing. Filed Feb. 25, 1960, Ser. No. 10,860
3 Claims. (Cl. 260—397.47)

This invention relates to a new series of oxygenated steroids of the pregnene series and to methods for their preparation. More particularly, this invention relates to novel 1-hydroxy derivatives of Reichstein's Compound S (4-pregnene-17α,21-diol-3,20-dione) and to the preparation of these compounds by a fermentation process wherein fermentation and oxygenation of Compound S and the 21-ester derivatives thereof are accomplished by means of certain fungi of the order *Mycelia sterilia*.

We have found that various species of several genera representative of *Mycelia sterilia* upon contact with a steroidal substrate under a particular set of conditions, hereinafter described, results in the introduction of an oxygen function at C-1, C-2, and C-11 (by "oxygen function" we usually mean hydroxyl group; except only that in certain instances, we have found that a C-11 methylene group is transformed into a C-11 keto group). Our studies indicate that the predominant products of the fermentation contain one more oxygen function per molecule than the starting material. Thus, we have found that Compound S may be transformed into one of five products depending upon the species of microorganism used, the media employed and the reaction conditions. We have obtained from the fermentation of Compound S: cortisone, hydrocortisone, the 11-epimer of hydrocortisone, 1-hydroxy Compound S and 2-hydroxy Compound S in varying combinations and concentrations.

It is a particular object of this invention to provide a means for introducing a hydroxyl group into the 1-position of Compound S or into the 21-ester derivatives thereof. It is a further object of this invention to provide a means for controlling the reaction so as to obtain a predominance of the 1-hydroxylated products over the others. It is an additional object of this invention to provide a means for separating mixtures of the oxygenated products so that these products may be used for the purposes indicated, such as therapeutics or chemical intermediates.

As disclosed in our copending application, Serial No. 666,759, filed June 19, 1957, now United States Patent No. 2,968,595, issued January 17, 1961, of which this application is a continuation-in-part, we have found that representatives of various genera of the order *Mycelia sterilia* are able to effect one or more of the above transformations, in particular, species of the genus Rhizoctonia and of the genus Sclerotium. It is to be noted that prior to the filing of said copending application there had been no publication on the microbiological hydroxylation of steroids at the 1- or 2-positions or on the novel 1-hydroxy derivatives of Compound S of the instant claims. This invention, therefore, provides both a new series of valuable steroidal intermediates and a novel means of synthesizing these useful compounds.

Our novel 1-hydroxy derivatives of Compound S, having as they do the 3-keto-Δ⁴-system and a dihydroxy acetone side chain, are of particular value as intermediates in the preparation of prednisolone, prednisone and the 21-ester derivatives thereof. The several reactions involved in these conversions are relatively simple and are all well-known in the art. For example, the 3-keto-Δ¹,⁴-system may be introduced into 1-hydroxy Compound S by removing the 1-hydroxy substituent according to the method described by Greenspan et al. (J.A.C.S., vol. 79, pp. 3922, 1957) or according to methods analogous to those disclosed in United States Patent No. 2,737,518. The resulting 11-desoxy pregnadiene can then be converted to prednisolone by microbiologically introducing a hydroxy group at C-11 by means of a microorganism such as *Curvularia lunata* (N.R.R.L. 2380) according to procedures analogous to those described in United States Patent No. 2,658,023. The 11-epimer of prednisolone may be prepared by employing *Rhizopus nigricans* (A.T.C.C. 6227(b)) as the microorganism according to procedures analogous to those described in United States Patent No. 2,602,769. Oxidation of either of these compounds by procedures well understood in the art, such as by treatment with chromic acid in pyridine at room temperature or below (preferably after esterifying the 21-hydroxyl with a lower alkanoic acid or its anhydride or with an aromatic acid), yields prednisone.

As is well-recognized, prednisone, prednisolone and the 21-ester derivatives thereof are very valuable therapeutic agents. These compounds, however, are difficult to obtain. Compound S, on the other hand, is readily available by known synthetic routes from several naturally occurring and relatively cheap steroidal starting materials such as the vegetable-type steroid compounds. Any intermediate, therefore, which may be readily derived from Compound S and which may be subsequently converted into the corresponding prednisone or prednisolone derivative in good yield and without undue expense; is of tremendous value to the pharmaceutical industry.

The microorganic biochemical oxygenation is carried out with the aid of the oxygenating fungus or the oxygenating enzymes obtainable therefrom. Organisms of the genera Rhizoctonia and Sclerotium have been known for sometime and are described in detail in various compendia on the subject such as Bessey, Morphology and Taxonomy of Fungi (1950), Blakiston Company, Philadelphia. Species of this genera are readily available in public culture collections, such as the American Type Culture Collection (A.T.C.C.) in Washington; the Centraal Bureau vor Schimmelkultures (C.B.S.) Baarn, Holland; Northern Regional Research Laboratories (N.R.R.L.) Peoria, Ill.; Quartermaster Corp (Q.M.), Natick, Mass.; Commonwealth Mycological Institute (C.M.I.) Kew, Surrey, England. Various species of Rhizoctonia which have been used in our transformations are sp. *solani* A.T.C.C. 10157 and 10187; *ferruginea* C.B.S.; *gossypii* var. *aegyptica* C.B.S. Various species and strains of Sclerotium which have been used are *rolfsii* A.T.C.C. 12450, *oryzae*, var. *irregularis* C.B.S.; sp. QM 93A.

In carrying out the oxygenation process of the present invention, a fungus preferably of the genus Rhizoctonia or of Sclerotium such as *Rhizoctonia ferruginea* or *Sclerotium oryzae* var. *irregularis* is cultivated in a suitable nutrient medium and allowed to act upon Compound S. During the growth of the organism under favorable conditions, the oxygen group or groups is introduced into the 1-position. The exact mechanism of this oxidation is unknown; however, it seems apparent that it is a result of enzymes produced by the growing organism.

A suitable nutrient medium contains a soluble source of carbon, nitrogen and mineral elements which provide carbohydrates, vitamins, minerals and nitrogenous building blocks for the organisms' growth. Sources of carbon as carbohydrates include glucose (dextrose), cerelose, starches, sucrose, as well as various natural products containing carbohydrates such as corn steep liquor, soya bean meal, soya bean oil and many other substances which have been used heretofore in fermentation processes.

Usually a variety of carbon sources are used in a medium with good results.

Various formulations comprising media which have been found useful in supporting growth of the organisms are as follows:

MEDIUM I

| | | |
|---|---|---|
| Corn steep liquor | ml | 6 |
| Ammonium dihydrogen phosphate | g | 3 |
| Calcium carbonate | g | 2½ |
| Soya bean oil | g | 2.2 |
| Yeast extract (Difco) | g | 2½ |
| Dextrose | g | 10 |

Water, q.s. to 1 liter.

MEDIUM II

| | | |
|---|---|---|
| Sodium nitrate | g | 2 |
| Potassium phosphate (tribasic) | g | 1 |
| Magnesium sulfate heptahydrate | g | 0.5 |
| Yeast extract (Difco) | g | 1 |
| Potassium chloride | g | 0.5 |
| Dextrose | g | 50 |
| Water | liters | 1 | pH adjusted to 5.0.

MEDIUM III

| | | |
|---|---|---|
| Malt extract | g | 20 |
| Peptone | g | 1 |
| Dextrose | g | 20 |
| Distilled water | liters | 1 |

MEDIUM IV

| | | |
|---|---|---|
| Edamin (Sheffield) | g | 20 |
| Corn steep liquor | g | 3 |
| Dextrose | g | 50 |

Tap water, q.s. to 1 liter.
pH adjusted 4.3 to 4.5.

Many other types of nutrient media can be prepared according to methods well-known in the art.

In general, the fungus is grown in the nutrient medium for periods ranging from 3 to 10 days depending upon the particular species, generally in flasks on a rotary shaker. After the growth period the mycelium is collected and homogenized with transfers being made aseptically. The fermentation flasks contain the same medium as that used to culture the organism. Growth is permitted to continue in the fermentation flasks for a period of 2 to 4 days after which time Compound S is added. The fungi, especially the Rhizoctonia, grow at all temperatures between 20 and 36° C. and it is possible to effect the oxidation process within these ranges, we prefer, however, to employ temperature ranges between 23 and 28° C. During the fermentation process aeration may be provided by forcing sterile air through the mixture or in the case of shake flasks sufficient oxygen is obtained from the air above the surface of the liquid medium. If necessary, antifoaming agents such as silicones, glyceride oils and the like may be added from time to time.

Compound S, although preferably added as a solution in ethanol or methanol or other water-miscible solvents, will generally precipitate from the solution upon admixture of the fermentation medium. Upon precipitation, it is dispersed throughout the medium as a fine suspension and it is thus readily available to the organism for oxidation. The concentration of Compound S added to the fermentation may be as high as 5.0 g. per liter, but is generally in the order of 0.1 to 1.0 gram per liter of medium.

At the conclusion of the fermentation process, the oxygenated Compound S is recovered from the fermentation medium by extractive methods and chromatographic techniques later described.

The progress of a fermentation or the products obtained from a fermentation are partially identifiable by paper chromatographic techniques. It is known to employ known steroids as standards and compare their migration with an unknown. In general, the different steroids can be identified by their position on the chromatographic strips.

Although we have found that organisms of the order *Mycelia sterilia* and especially of the genera Rhizoctonia and Sclerotium produce oxygenation at one or more of three positions comprising C–1, C–2 and C–11, we have found that certain species under particular conditions produce a predominance of one or at the most two of the oxygenated products. For example, we have found that *Rhizoctonia ferruginea* preferentially converts Compound S into 1-hydroxy Compound S and 2β-hydroxy Compound S with only trace quantities of 11-oxygenation taking place. On the other hand, *Rhizoctonia solani* from Gossypsium sp. C.B.S. in Medium I described heretofore, transforms Compound S principally into 1-hydroxy Compound S; *Rhizoctonia solani* from Citrus sp. C.B.S. and *Rhizoctonia solani* var. *lycopersici* C.B.S. do similarly.

As stated heretofore, a convenient method for analysis for the oxygenated steroid products and the separation of these products in purified form is the method of column chromatography using various adsorbents. Although a variety of adsorbents may be used, such as the various aluminas, silica gels and the like, we prefer especially to treat silicic acid so as to obtain a more active adsorbent and one which will permit greater ease in partition of components. We prepare our adsorbent as follows: Mallinckrodt silicic acid Batch No. 2847 is activated by washing same twice with equal volumes of acetone and is dried preferably under a heating lamp. For a higher degree of activity, the silicic acid is first washed with an acetone-ether (3:1) solution and then dried. The chromatographic column is prepared by agitating the silicic acid with anhydrous, alcohol-free chloroform and pouring the mixture into a glass column so designed to produce a silicic acid bed at least twice as high as its diameter. Since a given quantity of adsorbent can only adsorb a finite quantity of steroid, we have found that for a 3 g. mixture of steroids, 15 g. of silicic acid produces a very adequate column.

The adsorbent is thoroughly agitated to insure removal of suspended air bubbles and to produce a fine dispersion. The excess diluent is drained from the column and the sample steroid mixture is applied in chloroform solution.

The sample steroid mixtures are obtained from solvent extraction of the fermentation broths and followed by evaporation in vacuo leaving a residue consisting of the mixed steroid products. The residue is thoroughly dried over phosphorous pentoxide in vacuo and is dissolved in anhydrous alcohol-free chloroform. The solutions are filtered to remove insoluble contaminants and then applied directly to the column of silicic acid. The volume of chloroform used to solubilize the steroid residue does not appear to be critical.

In view of the fact that the silicic acid column, prior to adsorption of the steroid substrate, has a transparent glass-like appearance, the progress of adsorption and elution is easily followed. The adsorption of steroids produces distinct opaque bands at the site of adsorption. Thus, upon elution the opaque band can be observed during its passage through the transparent column bed.

The development of the column may be made by a gradient elution technique whereby chloroform and the chloroform solutions possessing increasing quantities of absolute methanol are passed through the silicic acid bed. Otherwise, the column may be developed by passage of chloroform and methanol in chloroform solutions over the silicic acid bed wherein the changes in methanol concentration are made manually.

In general, with chloroform development, the most lipophilic or non-polar steroids are eluted first with the more polar steroids being eluted by solutions containing the increased quantities of methanol.

The following examples are given by way of illustration and are not intended as a limitation of this invention. It will be apparent to one skilled in the art that there are more widely different embodiments of the present invention of which the following examples are but a few. It is to be understood, therefore, that the invention is only limited as defined in the appended claims.

In the fermentation methods described below, it is understood that sterile conditions are maintained with the various media being first sterilized by usual methods such as autoclaving prior to growth of the organism and that all transfers are made under aseptic conditions.

*Example 1*

A culture of *Rhizoctonia ferruginea* C.B.S. having been first grown on a Sabouraud dextrose agar slant was cultivated by adding a distilled water suspension of the organism to 50 ml. of sterile Medium No. 1 contained in each of fifteen 250 ml. shake flasks. The shaking process was carried out on a rotary shaker, having a diameter of rotation of two inches and operated at 280 r.p.m. The organism was permitted to grow during this first stage for a period of 7 days at a temperature of 23–28° C. After the growth period the contents of the flasks were pooled and homogenized in a previously sterilized Waring Blendor. 50 ml. of the homogenized mycelium were added to each of fifteen 2 l. shake flasks, each containing 400 ml. of Medium No. 1 with the entire operation being carried out under aseptic conditions. The culture was incubated for an additional forty-eight hours after which time 200 mg. of Compound S in 4 ml. of 80% ethanol were added to each flask and fermentation on the rotary shaker was carried out at 23° for five days. After the fermentation period, the contents of the flasks were pooled and the mycelium was separated from the liquid portion and then washed with distilled water. The mycelium and the liquid portion were separately extracted with chloroform followed by chloroform-methanol (4:1). The extracts were combined and concentrated to dryness in vacuo at temperatures not exceeding room temperature. The residue was taken up in anhydrous alcohol-free chloroform and the resultant solution was chromatographed on a silicic acid adsorption column described above. A methanol-chloroform gradient elution according to the procedure of Lakshmanan et al., Arch. Biochem. Biophys., 53: 258 (1954), was followed to separate steroidal transformation products and residual substrates. Starting material was collected in the first fractions, a compound later identified as 2β-hydroxy Compound S in the middle fractions and a compound later identified as 1-hydroxy Compound S in the last fractions. Homogeneity of each group of eluates was indicated by paper chromatography according to techniques well-known in the art.

The crystallization of the last group of fractions isolated from the fermentation mixture afforded 55 mg. of crystalline material, M.P. 180–200° C. dec. Recrystallization from acetone-hexane without application of heat raised the melting point to 193–207° C. dec. (with a transition occurring at about 170°). The following physical characteristics were observed $[\alpha]_D^{25}$ +89° (dioxane) (corrected for acetone of solvation), $$\lambda_{max.}^{MeOH}\ 241\ m\mu$$

($\epsilon$=16,500—corrected for acetone of solvation), $$\lambda_{max.}^{Nujol}\ 2.83,\ 5.81,\ 6.04,\ 6.18\mu$$

(one additional polymorphic variety has been observed).
*Analysis.*—Calcd. for $C_{21}H_{30}O_5 \cdot C_3H_5O$: C, 68.54; H, 8.63. Found: C, 68.41; H, 8.66.

The identity of the foregoing substance was established as 1-hydroxy S according to the following: Integration of the hydroxyl bands of the infrared spectrum confirmed the presence of three hydroxyl groups. Measurement of the U.V. spectrum in alkaline solution according to the methods of Meyer, loc. cit., showed a shift in the maximum from 241 m$\mu$ to 245 m$\mu$; however, no peak appeared in the 380 m$\mu$ region after two hours at 60°. This is consistent with the conversion of a 1-hydroxy-3-keto-$\Delta^4$-steroid into a $\Delta^{1,4}$-diene-3-ketosteroid, which transformation would be expected to occur under such conditions. Furthermore, the U.V. spectrum in alkaline solution was markedly different from that of a 2-hydroxy-3-keto-$\Delta^4$-steroid. The presence of the 3-keto-$\Delta^{1,4}$-diene system from the alkaline treatment was substantiated by the measurement of the polarographic reduction potential of the solution, according to Kabasakalian et al., Anal. Chem., 28: 1669 (1956). The observed shift in half-wave potential from 1.46 volts (before alkaline treatment) to 1.31 volts (after alkaline treatment), a shift of .15 volt, corresponds well to the shifts observed for cortisone vs. prednisone (0.16 volt) and cortisol vs. prednisolone (0.17 volt). Furthermore, a sample of the purified crystalline solid, obtained from the last group of eluates, upon pyrolysis at the melting point for ten minutes yielded a mixture of products whose infrared spectrum contained the characteristic $\Delta^{1,4}$-diene-3-one bands.

As final proof, a solution of the crystals of the last fraction of the eluates in chloroform was treated at room temperature with a trace amount of concentrated hydrochloric acid for two hours. Upon concentration in vacuo and recrystallization from acetone-hexane there was obtained 1,4-pregnadiene-17α,21-diol-3,20-dione, M.P. 237–240° C. whose M.P. and infrared spectrum were identical with that of an authentic sample.

From the foregoing, it is concluded that the substance obtained was 1-hydroxy Compound S with the configuration of the 1-hydroxyl group as yet unknown.

*Example 2*

By cultivating *Rhizoctonia solani* from Gossypium sp. C.B.S. in Medium No. 1, as described in Example 1 and using Compound S as substrate, there was obtained principally 1-hydroxy Compound S identified paper chromatographically and by column separation as described in the preceding example.

Similar results were obtained with *Rhizoctonia solani* from citrus sp. C.B.S. *Rhizoctonia solani* var. *lycopersici* C.B.S. produced predominantly 1-hydroxylation as indicated by paper chromatogram analysis.

The following table shows various microorganisms which have been found to effect the conversion of Compound S into the corresponding 1-hydroxy derivative with the products identified either by known paper chromatographic techniques or by procedures heretofore described. The organisms referred to in the table by number are identified as follows:

(1) *R. ferruginea* C.B.S.
(2) *R. solani* from Gossypium sp. C.B.S.
(3) *R. solani* from citrus sp. C.B.S.
(4) *R. solani* ATCC 10157, 10187
(5) *Sclerotium rolfsii* ATCC 12450
(6) *Sclerotium oryzae* var. *irregularis*

POSITION OF ADDED OXYGEN FUNCTION IN MAIN PRODUCT(S)

| Organism | 1 | 2 | 3 | 4 | 5 | 6 |
|---|---|---|---|---|---|---|
| Compound S | 1, 2β | 1 | 1, 2β | 1, 11α | 1, 11α | 1, 11α, 11β |

The operating examples described above solely for purposes of simplicity have been limited to the use of the free steroid as the substrate. This is not to be construed as a mandatory limitation, for one can equally well employ esters of Compound S in the oxygenation process. For example, in place of Compound S there may be employed Compound S 21-acetate. The esters which may be employed as substrates are not limited necessarily to lower alkanoyl esters, but may be any alkyl residue which is non-toxic to the organism such as acetates, propionates, cyclopentylpropionates, furoates, phenoxyacetates, tertiary-butylacetates, hemisuccinates, phosphates, and the like. The preferred alkyl residues are those containing up to 10 carbon atoms.

Conversely, when unesterified Compound S is applied as substrate, it may be transformed into any one of the foregoing esters which are useful therapeutically and well-known in the art, such as by reacting the steroid with an acylating agent such as an acid anhydride or halide in the presence of an acid acceptor such as pyridine or other tertiary bases.

We claim:
1. A compound of the formula:

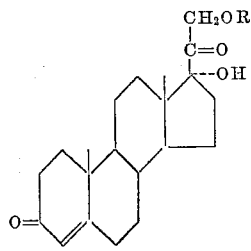

wherein R is a substituent selected from the group consisting of hydrogen and hydrocarbon carboxylic acid radicals having up to 10 carbon atoms, and having a hydroxyl radical attached to the A-ring at the 1-position.

2. The chemical compound 1-hydroxy-4-pregnene-17α, 21-diol-3,20-dione having a melting point of about 193–207° C. dec., a specific rotation at 25° C. of about +89° (dioxane), and ultra-violet spectrum in methanol characterized by a maximum at about 241 mμ ($E=16,500$), and an infra-red spectrum in mineral oil mull characterized by maxima at about 2.83, 5.81, 6.04 and 6.18μ.

3. The chemical compound 1-hydroxy-4-pregnene-17α, 21-diol-3,20-dione 21-acetate.

References Cited in the file of this patent
UNITED STATES PATENTS
2,737,518   Herzog _____ Mar. 6, 1956